July 13, 1965  E. LONG ET AL  3,194,741
NUCLEAR REACTOR FUELLING APPARATUS
Filed Jan. 31, 1962  2 Sheets-Sheet 2

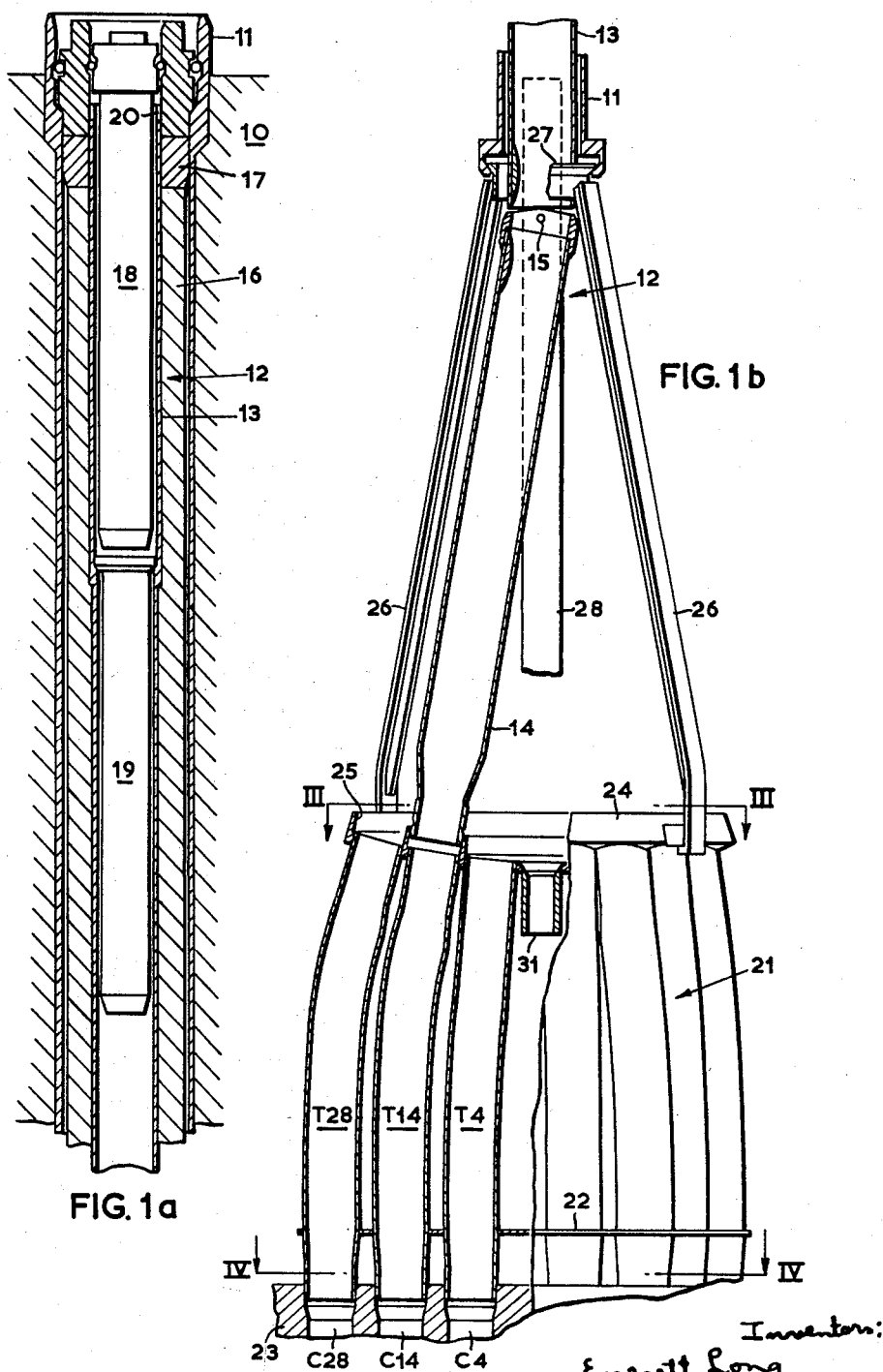

United States Patent Office 3,194,741
Patented July 13, 1965

3,194,741
NUCLEAR REACTOR FUELLING APPARATUS
Everett Long, Thomas Cyril Greaves, and William John Knight, all of Whetstone, England, assignors to The English Electric Company Limited, London, England, a British company
Filed Jan. 31, 1962, Ser. No. 170,162
Claims priority, application Great Britain, Feb. 1, 1961, 37,524/61, 3,793/61
3 Claims. (Cl. 176—30)

This invention relates to apparatus for providing access to a group of fuel element channels in a nuclear reactor through an access hold in the biological shielding.

According to the invention, the apparatus includes, in combination, a rotatable charge chute adapted to be mounted in the duct and carrying a guide member movable angularly with respect to the axis of the charge chute, and an assembly of fixed fuel element guide tubes positioned adjacent the servicing ends of the fuel channels, each guide tube being aligned at one end with one of the fuel channels within the group and the other ends being positioned on a plurality of radii struck from a point in alignment with the axis of the charge chute, the arrangement being such that by appropriate rotational movement of the charge chute and/or appropriate angular movement of the movable guide member access may be obtained through the appropriate fixed guide tube to any particular fuel element channel within the group.

According to a further feature of the invention, actuating means are provided for automatically causing appropriate angular movement of the movable guide member in response to rotational movement of the charge chute.

Further preferred features will appear from the following description with reference to the accompanying drawings where there is illustrated a preferred form of apparatus according to the invention for use in a gas cooled graphite moderated nuclear reactor having vertical fuel channels and fueling from the top of the reactor.

Figure 3:
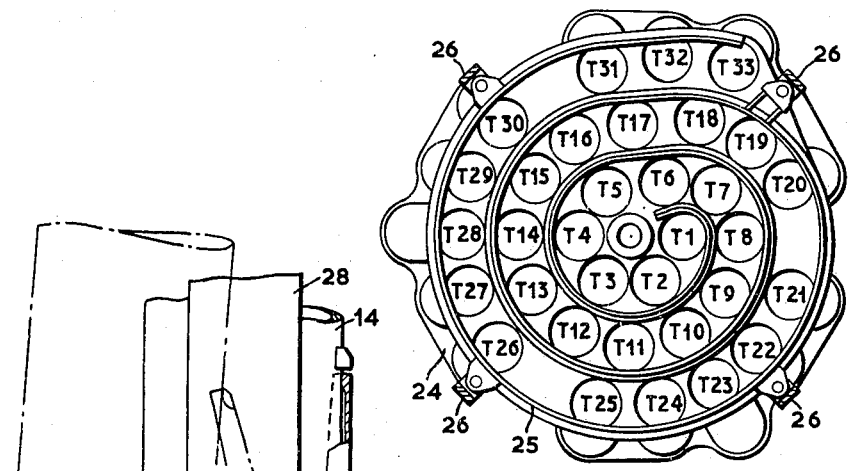
Figure 2:
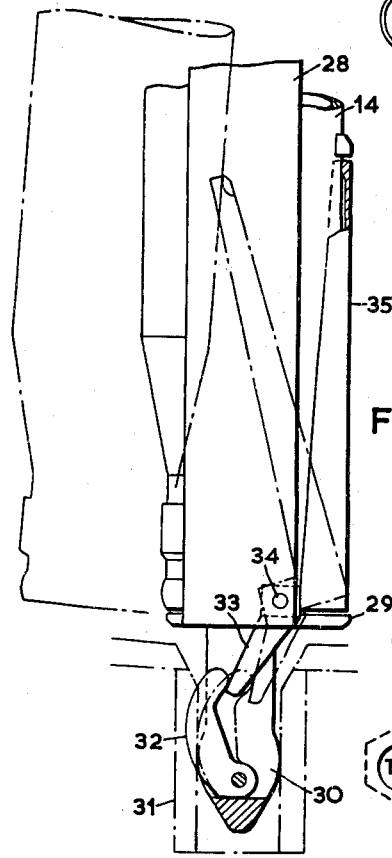
Figure 4:
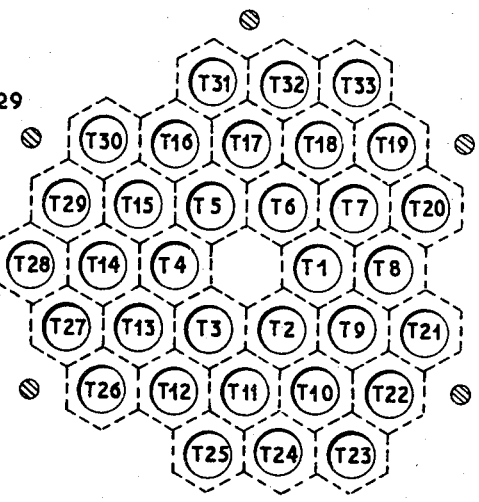

FIGS. 1a and 1b are part sectional elevations of the upper and lower parts of the apparatus respectively, FIG 2 is an enlarged view of the lower end of the charge chute, FIG. 3 is a sectional plan taken on the line III—III of FIG. 1b, whilst FIG. 4 is a sectional plan taken on the line IV—IV of FIG. 1b.

Referring now to the drawings, the upper concrete biological shield of the reactor, which also serves as a pressure vessel, is indicated at 10 and one of the standpipes or access ducts at 11. In each standpipe there is fitted a charge chute generally indicated at 12.

The charge chute comprises a rotatable main access tube 13 and an extension tube 14 which is pivoted at 15 to the main access tube. The standpipe incorporates a removable shield plug assembly 16 and the charge chute is supported on a thrust race 17. The charge chute itself incorporates two removable shield plugs 18 and 19 and the upper end of the main access tube is splined at 20 so that it may be rotated to any azimuth position when engaged by a fueling machine.

Supported from the lower end of the standpipe 11 is a guide tube assembly generally indicate at 21. The assembly comprises thirty three fuel element guide tubes T1 to T33 which at their lower ends are held on a triangular lattice by means of a transverse plate 22. The triangular lattice corresponds to the triangular lattice of the thirty three parallel fuel element channels C1 to C33 in the core 23 which are to be served through the standpipe. It can be seen that the standpipe axis is parallel with the extended axes of the fuel channels. The lower ends of the guide tubes extend into the fuel channels.

The upper ends of the guide tubes are arranged to lie on a continuous approximate spiral by means of a dished plate 24 which also incorporates a cam track 25 following the spiral. The spiral is in the form of a number of part-circles, each of which corresponds with part of one or or other of a number of pitch circles concentric with the charge chute axis (the upper ends of the guide tubes lying on the pitch circles), the part-circles being joined by straight portions tangential thereto. The assembly is supported from the lower end of the standpipe 11 by four suspension arms 26 which are pivotally connected at their upper ends to a suspension ring 27 captively secured to the standpipe.

Referring now more particularly to FIG. 2, attached to the main access tube 13 of the charge chute are two downwardly depending straps 28 which are connected at their lower ends to the flanged top 29 of a locating pin 30. When the charge chute is lowered into the standpipe this locating pin enters into a bush 31 on the dished plate 24 so as to locate the lower end of the charge chute.

The locating pin 30 is slotted and fitted in the slot is a lever 32 which, with the pin 30 clear of the bush 31, takes up the attitude illustrated by the full lines. This lever engages a further lever 33 which is pivoted at 34 to the two straps 28 and which carries an extension arm 35 which is arcuate in form and engages at its upper end the extension tube 14.

The charge chute is inserted into the standpipe with the extension tube 14 in alignment with the main access tube 13 and from the foregoing it will be clear that as the locating pin 30 enters into the bush 31 the lever 32 will automatically move the extension tube 14, via the lever 33 and its extension arm 35, to the position shown chain dotted in FIG. 2. Assuming the charge chute to be in the correct azimuth position the lower end of the extension tube will then lie over the guide tube T1 communicating with the fuel element channel C1.

As will be seen from FIG. 3 the upper ends of the guide tubes T1 to T5 lie on one of the pitch circles mentioned above so that, assuming the two shield plugs 18 and 19 have previously been removed, appropriate rotational movement of the charge chute will bring the lower end of the extension tube into alignment with any of these tubes and the corresponding fuel element channels C1 to C5 may be serviced. Further rotational movement of the charge chute will then cause the lower end of the extension tube 14 to enter between the walls of the cam track 25 so that with continued appropriate rotational movement of the charge chute the lower end of the extension tube may be brought into alignment with any of the guide tubes T6 to T33.

It will thus be seen that simple rotational movement of the charge chute by itself provides access to any of thirty-three fuel element channels. When fueling operation is completed the shield plugs 18 and 19 are replaced in the charge chute and the fueling machine is moved to the standpipe providing access to the next group of fuel element channels which require servicing.

Whilst it is preferably to provide a charge chute and guide tube assembly for each standpipe (this allows the usual hole preparation machine to be dispensed with) a single charge chute may if desired be moved about from one standpipe to the other as required. In this case a hole preparation machine will of course be required.

The apparatus is not of course limited to the fueling of graphite moderated gas cooled reactors but may be applied to any reactor to which access is required to a number of fuel element channels through a single access hole.

What we claim as our invention and desire to secure by Letters Patent is:

1. In a nuclear reactor including a pressure vessel, a reactor core within the pressure vessel, means defining a group of parallel fuel channels in the core and means defining an access duct through the pressure vessel between the outside and inside thereof and parallel with extended axes of the fuel channels; charging apparatus in the pressure vessel comprising a rotatable charge chute in said access duct, an extension tube having one free end and being pivoted at its other end on said charge chute within the pressure vessel, an assembly of fixed fuel element guide tubes over said core, the lower end of each guide tube being aligned with a fuel channel of said group, and the upper ends of the guide tubes in the assembly defining a continuous spiral and being positioned on a plurality of pitch circles concentric with the charge chute axis so that part of each pitch circle constitutes a part of said continuous spiral, means on said guide tube assembly for guiding the charge chute during rotation thereof and means on the guide tube assembly for guiding the said free end of the extension tube along the said continuous spiral so that the said free end communicates successively with the said fixed guide tubes as the charge chute rotates.

2. Charging apparatus according to claim 1, wherein the means for guiding the said free end of the extension tube comprise a continuous cam track on the guide tube assembly following said continuous spiral and comprising part-circular portions concentric with said pitch circles and straight portions tangentially joining said part-circular portions.

3. In a nuclear reactor including a pressure vessel, the reactor core within the pressure vessel, means defining a group of parallel fuel channels in the core and means defining an access duct through the pressure vessel between the outside and inside thereof and parallel with extended axes of the fuel channels; charging apparatus in the pressure vessel comprising a rotatable charge chute in said access duct, an extension tube having one free end and being pivoted at its other end on said charge chute within the pressure vessel, an assembly of fixed fuel element guide tubes over said core, the lower ends of each guide tube being aligned with a fuel channel of said group, and the upper ends of the guide tubes in the assembly defining a continuous spiral and being positioned on a plurality of pitch circles concentric with the charge chute axis so that part of each pitch circle constitutes a part of said continuous spiral, means on said guide tube assembly for guiding the charge chute during rotation thereof, means on the guide tube assembly for guiding the said free end of the extension tube along the said continuous spiral so that the said free end communicates successively with the said fixed guide tubes as the charge chute rotates, deflecting lever means on the charge chute operatively coupled to the extension tube adjacent said free end thereof, and a lever-engaging member on the guide tube assembly for engaging the lever means so as on engagement therewith to cause the lever means to deflect the extension tube until the said free end thereof lies over one of said pitch circles.

References Cited by the Examiner

UNITED STATES PATENTS

| | | | |
|---|---|---|---|
| 682,822 | 9/01 | Toepel | 74—569 X |
| 2,782,158 | 2/57 | Wheeler | 176—59 |
| 2,984,612 | 5/61 | Hackney | 176—30 |

OTHER REFERENCES

Dent et al.: Uranium Fuel Handling, in British Nuclear Energy Conference Journal, vol. 2, pages 146 to 155.

CARL D. QUARFORTH, *Primary Examiner.*